Figure 1:
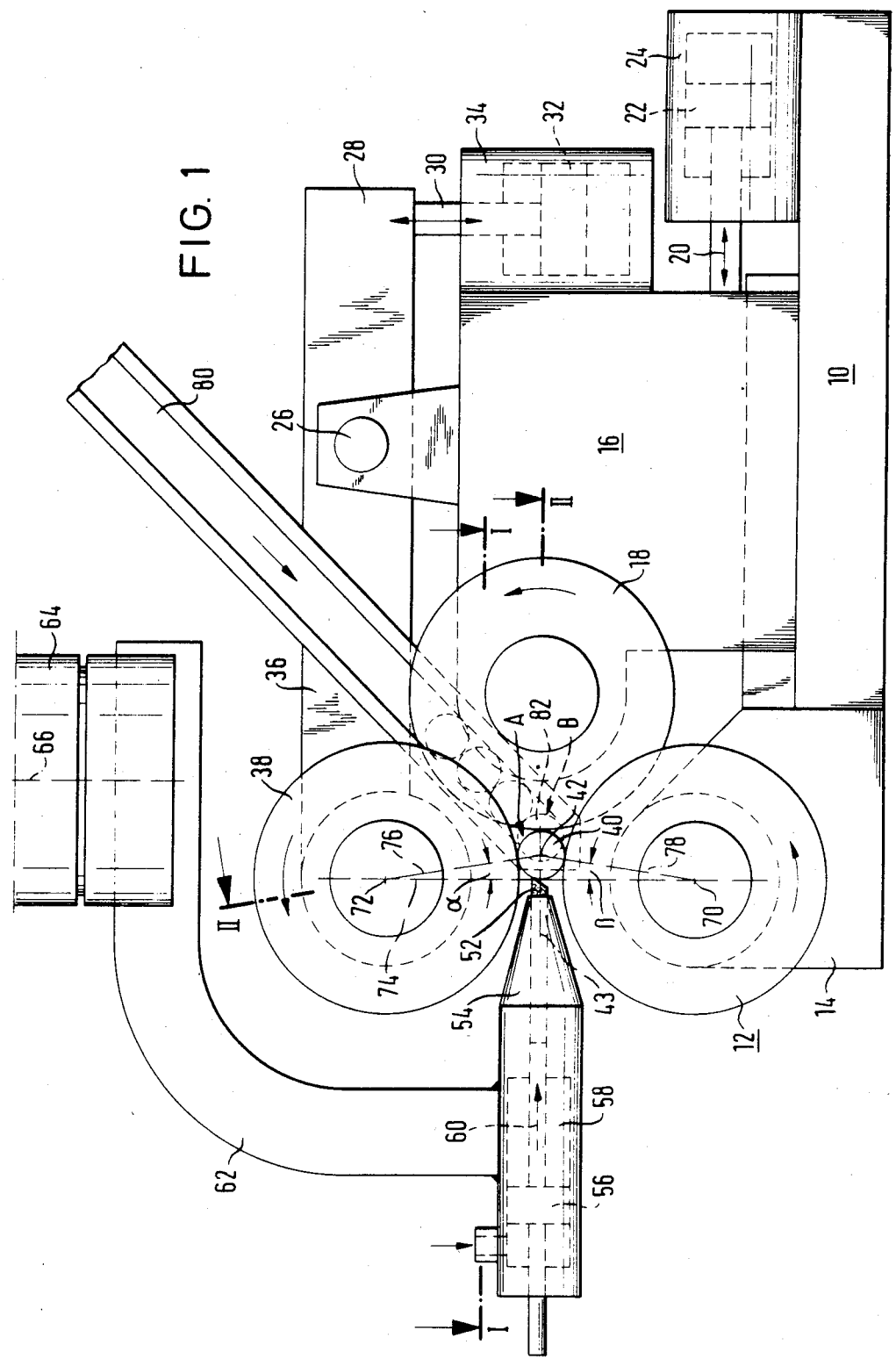

United States Patent [19]

Winkelmann

[11] Patent Number: 4,563,838

[45] Date of Patent: Jan. 14, 1986

[54] APPARATUS COMPRISING A MACHINING TOOL FOR MACHINING ROLLERS

[75] Inventor: Wolfgang Winkelmann, Wolfach, Fed. Rep. of Germany

[73] Assignee: Maschinenbau Grieshaber GmbH & Co., Wolfach, Fed. Rep. of Germany

[21] Appl. No.: 593,433

[22] Filed: Mar. 26, 1984

[30] Foreign Application Priority Data

Mar. 30, 1983 [DE] Fed. Rep. of Germany ....... 3311720

[51] Int. Cl.⁴ .............................................. B24B 5/26
[52] U.S. Cl. ...................................... 51/58; 51/215 H
[58] Field of Search ................ 51/58, 57, 215 H, 236, 51/216 T, 289 R, 215 CP, 215 VE; 414/224

[56] References Cited

U.S. PATENT DOCUMENTS

| | | | |
|---|---|---|---|
| 2,270,525 | 1/1942 | Johnson | 51/236 |
| 2,379,281 | 6/1945 | Cramer | 51/236 |
| 3,023,552 | 3/1962 | Grobey et al. | 51/236 |
| 3,041,691 | 7/1962 | Vanier | 51/236 |
| 3,140,569 | 7/1964 | Murray | 51/236 |
| 3,145,861 | 8/1964 | Gargrave | 51/236 |
| 3,197,925 | 8/1965 | Westberg | 51/236 |

FOREIGN PATENT DOCUMENTS

| | | | |
|---|---|---|---|
| 2326691 | 12/1974 | Fed. Rep. of Germany. | |
| 0522951 | 9/1976 | U.S.S.R. | 51/58 |
| 0779051 | 11/1980 | U.S.S.R. | 51/216 T |

Primary Examiner—Frederick R. Schmidt
Assistant Examiner—Robert A. Rose
Attorney, Agent, or Firm—Dennison, Meserole, Pollack & Scheiner

[57] ABSTRACT

An apparatus having a machining tool (52) for machining rollers (40) having a marked curvature and rotating while being machined contains two guiding disks (12,38) and a supporting disk (18) which are pivoted. The guiding disks (12,38) surround roller (40) in a machining position (A) on both sides and symmetrically to a transverse axis (43) running through the center (42) of roller (40). Each guiding disk (12,38) consists of two index disks (46) which eccentrically touch roller (40) by their surface areas (48) which are adapted to roller (40). Supporting disk (18) projects into the gap between index disks (46) and may be slided into a position averted from the machining tool (52).

11 Claims, 3 Drawing Figures

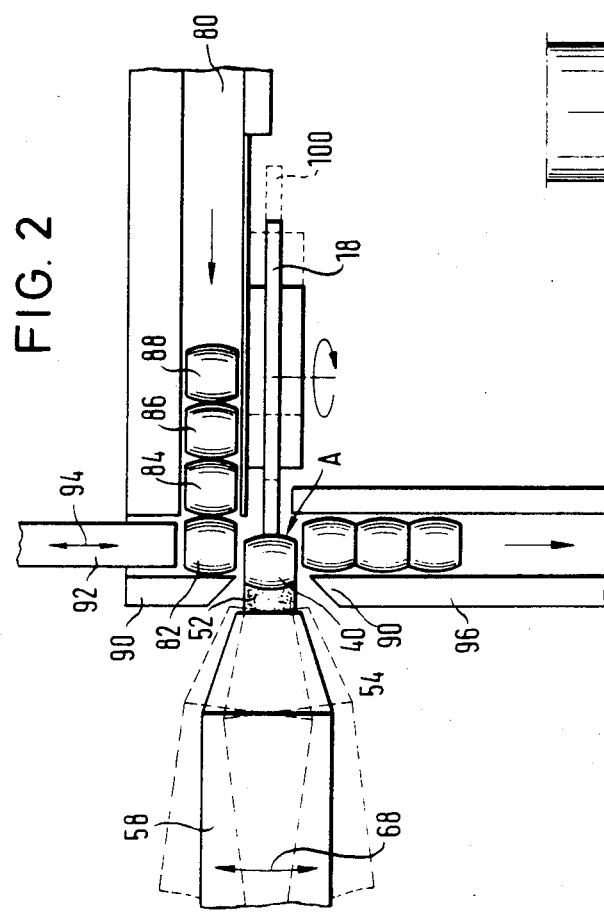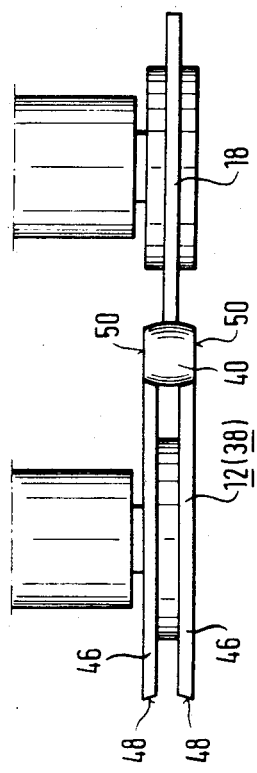

APPARATUS COMPRISING A MACHINING TOOL FOR MACHINING ROLLERS

The invention relates to an apparatus comprising a machining tool for machining rollers having a marked curvature, in particular barrel-shaped rollers which rotate while being machined and have particularly small dimensions.

Cylindrical or slightly spherical rollers are machined in a continuous process. In said process the rollers are guided between two rolls rotating in the same direction under axially swinging honing stones, the axes of the rolls being inclined against each other. For rollers having a marked curvature, such as barrel-shaped rollers, said method is no longer applicable. Such rollers are machined by the gashing method in which the rollers are individually put between grooved rolls and the honing stone makes a to- and fro-movement corresponding to the radius of curvature of the surface line of the roller. Said method may also be applied in markedly spherical rollers having small dimensions. Machines having several machining stations arranged side by side, however, are to be fed with difficulty and to be reset in a complicated way. The adjustment of the swing radii of all honing stones requires expensive mechanical means; the exchange of the guiding rolls for the supporting rings corresponding to the rollers as well as the adaptation of the means for feeding and feeding away are expensive.

The object underlying the invention is to develop an apparatus comprising a machining tool for machining rollers having a marked curvature, in particular barrel-shaped rollers, which may be adjusted more readily to different rollers having a marked curvature by avoiding the difficulties described in the foregoing and in which the rollers can be transported simply and rapidly into the machining position and removed from said position upon termination of the machining.

According to the invention this problem is achieved in that the rollers each can be clamped in a machining position between a rotary supporting disk diametrically opposite to the machining tool and two rotary guiding disks disposed on both sides of the point of attack of the machining tool, the guiding disks each having two index disks eccentrically resting against the roller to be machined, and that the supporting disk and one of the guiding disks are movable into a workpiece-receiving and a workpiece-giving-off position for the lateral feeding and feeding-away of one roller each, said workpiece-receiving and workpiece-giving-off position being remote from the machining position.

This arrangement allows a firm and secure clamping of the rollers. Said arrangement is accessible in the axial direction from two sides for each the feeding of rollers to be machined and for removing the rollers already machined. It is possible to bring within a short period of time the apparatus from the working position, in which a roller is clamped between the guiding disks and the supporting disk and pressed against the machining tool, by a corresponding sliding movement into the giving-off and receiving position provided for removing the machined roller and for supplying it with a new roller. To clamp the roller lying in receiving position by means of the sliding movement taking place in the reverse direction takes only little time, as well. The arrangement may readily be adjusted to different rollers e.g. by exchanging the index disks. Another advantage is to be seen in that several similar apparatuses can be arranged side by side, the apparatuses each carrying out different types of machining, e.g. rough-machining and fine-machining of the rollers. The machining rates may be harmonized so as to make an automatic machining in a continuous process possible.

Preferably, the supporting disk can be pressed against the center of the respective roller, diametrically to the machining tool, achieving a firm clamping of the roller at the lowest expenditure of energy.

In a preferred embodiment the machining tool is a honing stone movable to and fro, transversely to the rotating movement of the roller. By virtue of this arrangement the finest machining of the rollers can be carried out.

Most expediently, the guiding disks containing two index disks each are driven synchronously and in the same direction. The guiding disks, thus, transmit the forces required for rotation onto the roller, while the supporting disk is taken along by the clamped roller. This is why the supporting disk can be developed especially for exerting pressure on each the roller and have a low mass. As the clamped roller is driven in two places along the round periphery, the driving forces transmitted suffice to keep the roller rotating even at greater contact pressures between roller and machining tool. A preferred embodiment provides that the connecting line running between the centers of the two guiding disks each forms an acute angle with the connecting line running from the center of the one guiding disk to the center of the roller and with the connecting line running from the center of the other guiding disk to the center of the roller. In said arrangement the guiding disks are arranged on the one side and the supporting disk on the other side of the roller kept in machining position. This allows the achievement of a firm and uniform clamping which, nontheless, leaves a large space open for the machining tool.

In an expedient embodiment one of the guiding disks is slidably disposed vertically or approximately vertically and the supporting disk in parallel to the pressure exerted by the machining tool on the center of the roller. To release the machined rollers the guiding disk and the supporting disk are moved from the clamping position into an idle position. By virtue of this the roller is laterally accessible for its removal. Upon the removal of the machined roller another roller may be introduced which subsequently is brought by a corresponding sliding movement of the guiding disk and the supporting disk into the machining position and is clamped therein.

In another preferred embodiment it is provided that the one guiding disk resting against the roller may be withdrawn vertically or approximately vertically to the sliding direction of the machining tool from the roller, and that thereafter the supporting disk may be withdrawn in opposite direction to the pressure of the machining tool. In this arrangement the one guiding disk and the supporting disk move in the same direction in a first working step. When doing so, the roller is lifted from the machining tool also under the influence of the rotary movement of said guiding roll and moved into the direction of a discharge position. The roller, thus, takes a defined position. Thereafter, the guiding disk moves into a final position and releases the machined roller which may be removed by correspondingly aligned transport means from its defined position.

Another expedient embodiment resides in that on the side of the supporting disk resp. the guiding disks which is opposite to the feed side channel there is disposed a discharge channel with its end at the level of the workpiece-receiving and workpiece-giving-off position. In this embodiment a movable member, a piston, is sufficient to remove the machined roller from its releasing position and to move a roller to be machined into said position at the same time. The roller transport can, therefore, be carried out in a simple way and in a very short period of time, the running time of the rollers being reduced, as well.

Preferably, on the side of the supporting disk resp. the guiding disks, which is opposite to the feed side channel there is provided a discharge channel with its end at the level of the workpiece-receiving and workpiece-giving-off position.

Further particulars, features and advantages of the invention are explained below by the aid of an example of embodiment illustrated in the drawing.

FIG. 1 shows a side view of an apparatus comprising a machining tool for machining barrel-shaped rollers having small dimensions, FIG. 2 shows a section along the lines I—I of the apparatus illustrated in FIG. 1, FIG. 3 shows a section along the lines II—II of the apparatus illustrated in FIG. 1.

An apparatus for machining barrel-shaped rollers having small dimensions, such as a diameter of less than 5 mm and a length of 5 mm, comprises a stationary machine frame 10 on which a lower guiding disk 12 is pivoted. Guiding disk 12 is supported by a bearing block 14 which is connected with machine frame 10. Further, on machine frame 10 a carriage 16, on whose one end a supporting disk 18 is pivoted, is slidably mounted. The sliding direction of carriage 16 is illustrated by arrow 20 in FIG. 1. The sliding of carriage 16 is carried out vertically to the center of rotation of supporting disk 18. The transmission of power on carriage 16 is effected by a piston 22 connected to carriage 16 by means of a shaft not specified more closely. Piston 22 is guided in cylinder 24 acted upon by a pressure medium and arranged on machine frame 10.

On carriage 16 a bearing block which is not specified more closely and on which a lever 28 is swivelling mounted via axis 26 is fixed. Lever 28 is connected through shaft 30 with piston 32 led in cylinder 34. Cylinder 34 is connected to carriage 16. Shaft 30 acts on the right arm of lever 28. With the action of a pressure medium on piston 32 lever 28 is swivelled. At the end of the left arm 36 of lever 28 a second guiding disk 38 is pivoted. Guiding disks 12 and 38 are pivotally attached about perpendicular axes. To drive the two guiding disks 12 and 38 a motor not shown can be used which is connected by a belt with corresponding driving pulleys of guiding disks 12, 38. To drive guiding disks 12, 38 a toothed belt may be used, as well. What is essential is that guiding disks 12, 38 are driven synchronously and in the same direction.

Dependent on the positions of pistons 22, 32 in cylinders 24, 34 supporting disk 18 and the guiding disk 38 take diverse positions as against guiding disk 12. In FIG. 1 a final position of guiding disk 38 and of supporting disk 18 is shown which corresponds to the machining position of a barrel roller 40 clamped between guiding disks 12, 38 and supporting disk 18. In its machining position barrel-shaped roller 40 is between guiding disks 12,38 arranged symmetrically to a transverse axis 43 running through the center 42 of barrel-shaped roller 40. Each guiding disk 12, 38 contains two spaced index disks 46, whose surface areas 48 are adapted to barrel-shaped roller 40. Surface areas 48 touch the barrel-shaped roller 40 disposed in machining position eccentrically and symmetrically to the center of barrel-shaped roller 40. Preferably, the distance between index disks 46 is so large that surface areas 48 touch the rounded surface area of barrel-shaped roller 40. Supporting disk 18 projects into the gap between the index disks 46.

In the machining position of barrel-shaped roller 40 supporting disk 18 pressed against barrel-shaped roller 40 is diametrically opposite to a machining tool, which is a honing stone 52 and positioned axially movably in stone holder 54. Honing stone 52 is connected to piston 56 positioned in guide 58. Through piston 56 acted upon by the pressure medium honing stone 52 is pressed against barrel-shaped roller 40. The direction of the force exerted by honing stone 52 on the center of barrel-shaped roller 40 is illustrated by arrow 60 in FIG. 1. Said arrow 60 indicates the sliding direction of the honing stone as against barrel-shaped roller 40 at the same time. Owing to the small dimensions of barrel-shaped roller 40 small honing stones 52 are employed for which most expediently a stone guide is used, as it is described in DE-AS No. 23 26 691 and in particular in FIG. 3 of DE-AS No. 23 26 691.

Stone holder 54 is connected to guide 58 connected through carrier 62 with a swing drive 64 not shown in detail. Carrier 62, guide 58, stone holder 54 and honing stone 52 swivel about an axis 66 in two directions illustrated by arrow 68 in FIG. 2. Axis 66 can be adjusted in correspondence with radius of curvature of the barrel-shaped roller to be machined.

A connecting line 74 can be drawn between the centers 70, 72 of the two guiding discs 12, 38. In the machining position of the respective barrel-shaped roller 40 guiding disks 12, 38 are disposed with respect to each other that said connecting line 74 forms acute angles α, β with connecting line 76 running from center 72 to center 42 of barrel-shaped roller 40 and with connecting line 78 running from center 70 to center 42. Most expediently, said angles α, β are of the same size.

A barrel-shaped roller 40 may take two final positions between guiding rails 12, 38 and supporting disk 18. The one final position is the machining position which may be recognized in FIG. 1 by the drawn-out line of barrel-shaped roller 40. In FIG. 1 the machining position is designated by "A". The second final position in which the respective barrel-shaped roller is in the workpiece-receiving and the workpiece-giving-off position named briefly transport position in the following is also shown in FIG. 1. Prior to being shifted into machining position A or after the shifting from the machining position transport roller 40 lies in the transport position designated by "B".

Beside guiding disc 38 and supporting disk 18 there is arranged feedside channel 80 running in parallel to the planes of supporting disk 18 and guiding disks 12, 38. Feed side channel 80 has an inclined guide path which is not designated more closely and in which there are barrel-shaped rollers 82,84,86,88 to be machined and aligned in parallel to one another with their axes. The lower end of the guide path provided with stop 90 is arranged as against the guiding disks 12, 38 and supporting disk 18 in such a mode that the lowest barrel-shaped roller 82 is at the level of transport position B. On the side of the guide path which is averted from guiding disks 12, 38 and the supporting disk 18 above stop 90 there is provided an aperture which is not designated more closely and through which a piston 92 may be pushed in. The sliding direction of piston 92 is marked by 94 in FIG. 2.

On the side of the guiding discs 12, 38 and supporting disk 18 which is averted from feed side channel 80 there is disposed discharge channel 96. Discharge channel 96 runs slopingly, its upper end 98 being at the level of transport position B.

The sliding movement of carriage 16 and the swivelling movement of lever 28 are harmonized. It is only when carriage 16 is in its backward position, in which supporting disk 18 is in the most distant position from guiding disk 12, that the end of arm 36 of lever 28 is moving upwardly. This turn may be reversed when carriage 16 is moved towards honing stone 52. Then, end 36 is lowered; subsequently carriage 16 is moved against honing stone 52.

An operating cycle takes the following course:

When carriage 16 and guiding disk 38 are in their backward final position and guiding disk 38 is swivelled upwardly, the transport position B is free between guiding disks 12, 38 and supporting disk 18 when the roller 40 to be machined is the first of a series of rollers. In the other case a barrel-shaped roller lies in transport position B. Piston 92 now moves e.g. barrel-shaped roller 82 into transport position B in which supporting disk 18 takes the position drawn by broken line 100 in FIG. 2. During its axial sliding barrel-shaped roller 82 touches the barrel-shaped roller in transport position on front side 50 and pushes it into discharge channel 96. When barrel-shaped roller 82 has arrived in transport position B piston 92 is moved back into its backward final position. When doing so it clears the bottom place in the feed side channel 80. Said place then is taken by barrel-shaped roller 84. The remaining barrel-shaped rollers 86, 88 move downwardly by one roller thickness.

Supporting disk 18 is moved towards honing stone 52 and slides the barrel-shaped roller to be machined from transport position B into machining position A. Guiding disk 38 is swivelled downwardly towards transport roller 40 and, thus, barrel-shaped roller 40 is clamped. Now, piston 56 is acted upon by a pressure medium, while swing drive 64 is starting at the same time. By this honing stone 52 is pressed against barrel-shaped roller 40 and simultaneously moved to and fro till the desired shape of barrel-shaped roller 40 is achieved.

Finally, carriage 16 is slided into the direction opposite to honing stone 52. Thereafter, guiding disk 38 is slightly swung upwardly. Acting on the honing stone 52 by pressure is terminated and the swinging movement is interrupted. When the respective barrel-shaped roller is in transport position B, the procedure described in the foregoing is repeated.

I claim:

1. An apparatus for machining workpieces, such as barrel-shaped rollers or the like, having a surface curvature and being capable of rotation while being machined; said apparatus comprising a machining tool, a machine frame, a rotatable supporting disk mounted on said machine frame in spaced generally opposed alignment with the machining tool, two rotatable guiding disks mounted on said machine frame laterally to opposite sides of said machining tool, said guiding disks and supporting disk having workpiece retaining positions defining a work station therebetween for retention and rotation of a workpiece for machining engagement of said machining tool therewith, each guiding disk having two laterally spaced parallel disk components for engagement with a workpiece at laterally spaced points, said supporting disk lying in a plane parallel to and equidistant between said disk components, means mounting said supporting disk and one of said guiding disks for selected movement from the workpiece retaining position thereof to a remote position and means for selective feeding of workpieces into and out of said defined work station in a direction lateral to the aligned machining tool and supporting disk and generally perpendicular to the plane of said supporting disk.

2. The apparatus according to claim 1, wherein said work station and said supporting disk have aligned center points, said guiding disks in said workpiece retaining positions being disposed symmetrically to a plane running through the center point of the work station and any received workpiece, and the center point of said supporting disk, said disk components of said guiding disks having edge surfaces configured to conform to a received workpiece.

3. The apparatus according to claim 2, including means for urging said supporting disk toward said machining tool for movement of a received workpiece against the machining tool.

4. The apparatus according to claim 3, wherein said machining tool includes a honing stone and means mounting said stone for transverse movement across a disk rotated workpiece.

5. The apparatus according to claims 4, wherein said guiding disks are adapted to be driven synchronously and in the same direction.

6. The apparatus according to claim 2, wherein the two guiding disks include centers of rotation aligned along a first line extending radially outward from the centers of rotation of the guiding disks, said centers of rotation of the two guiding disks being aligned respectively along second and third lines with the center point of the work station, and second and third lines each forming an acute angle with the first line.

7. The apparatus according to claim 1, wherein the selective movement of the one guiding disk mounted for selective movement is substantially laterally of the aligned machining tool and supporting disk, and parallel to the supporting disk, and the selective movement of said supporting disk is generally toward and away from said machining tool.

8. The apparatus according to claim 1, wherein said supporting disk partially overlaps said guiding disks and is partially received between the disk components of each guiding disk, said movable guiding disk being withdrawable from the work station generally laterally of the aligned machining tool and supporting disk and parallel to the supporting disk, said supporting disk being withdrawable away from said machining tool.

9. The apparatus according to claim 1, wherein said means for selective feeding of workpieces includes a side feed channel for workpieces laterally of said disks, said feed channel having a discharge end, means for moving a workpiece from said discharge end to an offset position aligned with and offset from said work station and between said disks upon movement of said supporting disk and said movable guiding disk from the workpiece retaining positions thereof, and means for effecting a return movement of said supporting disk and said movable guiding disks into engagement with a received workpiece for a movement of said workpiece from said offset position into said work station.

10. The apparatus according to claim 9, including a discharge channel to the opposite side of the disks from said discharge end of said feed channel and in alignment with said offset position and said feed channel discharge end for reception of machined workpieces.

11. The apparatus according to claim 10 wherein said offset position accommodates a single workpiece whereby introduction of a workpiece from the discharge end of said feed channel effects movement of a prior workpiece from said offset position to said discharge channel.

* * * * *